No. 686,472. Patented Nov. 12, 1901.
T. Y. PAMPLIN.
ANTIRATTLER FOR VEHICLES.
(Application filed Jan. 16, 1901.)
(No Model.)
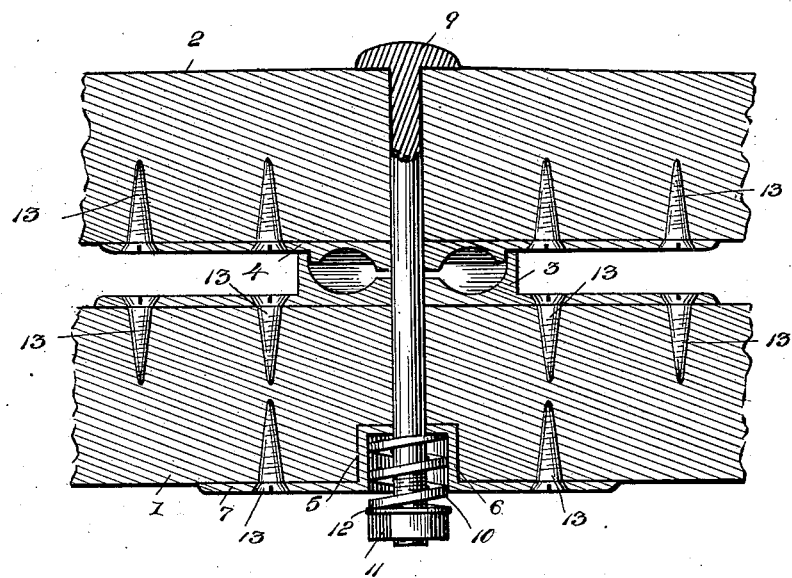
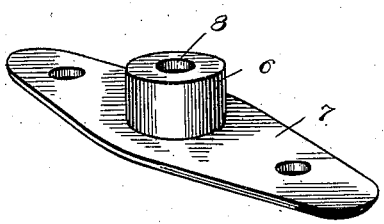
Inventor
T. Y. Pamplin,
Witnesses
By Victor J. Evans Attorney

UNITED STATES PATENT OFFICE.

THOMAS Y. PAMPLIN, OF HUNTSVILLE, ALABAMA.

ANTIRATTLER FOR VEHICLES.

SPECIFICATION forming part of Letters Patent No. 686,472, dated November 12, 1901.

Application filed January 16, 1901. Serial No. 43,630. (No model.)

*To all whom it may concern:*

Be it known that I, THOMAS Y. PAMPLIN, a citizen of the United States, residing at Huntsville, in the county of Madison and State of Alabama, have invented new and useful Improvements in Antirattlers for Vehicles, of which the following is a specification.

My invention relates to antirattler devices for vehicles, the object being to provide a simple and inexpensive device of this character adapted especially for use with the singletrees of vehicles.

The construction of the improvement will be fully described hereinafter in connection with the accompanying drawings, which form a part of this specification, and its novel features will be defined in the appended claim.

In the drawings, Figure 1 is a vertical longitudinal section of an antirattler device embodying the invention, and Fig. 2 is a view in perspective of the socket-plate detached from the cross-bar of the vehicle.

The reference-numeral 1 designates the cross-bar to which the vehicle-shafts are attached, and 2 designates the singletree, supported upon the cross-bar 1 by means of the coöperating bearing-plates 3 and 4. The under surface of the cross-bar 1 is formed with a recess 5 to receive a socket 6, projecting from a plate 7, which is secured to the under surface of the cross-bar. The socket 6 is provided with an opening 8, through which extends the pivot-bolt 9, which secures the singletree to the cross-bar.

10 designates a coil-spring fitted upon the lower end of the bolt 9 and extending within the socket 6. This spring is retained in position by means of a nut 11, fitting upon the end of the bolt, a washer 12 being interposed between the nut and the adjacent end of the spring. To prevent the nut from dropping off of the bolt, the lower end of the bolt after the nut has been placed in position is hammered to spread or expand the end, so that the nut cannot be removed.

As shown in Fig. 1, the bearing-plates 3 and 4, as well as the plate 7, are securely attached to the cross-bar and singletree by screws 13.

It will be obvious that the interposition of the spring 10 between the nut and the end of the socket 6 serves to hold the bearing-plates 3 and 4 close together, thus preventing rattling of the parts. The tension of the spring 10 is regulated by means of the nut 11.

While I have shown the improvement as applied to a singletree, I would have it understood that the invention is not restricted to this particular use or application, but may be effectively used upon other parts of a vehicle or wherever it is desirable to secure abutting parts to prevent rattling.

I claim—

The combination with a vehicle-singletree and a cross-bar formed on its under side with a recess; of coöperating bearing-plates between said singletree and cross-bar and an antirattler device comprising a plate secured to the under surface of the cross-bar and provided with a socket fitting within said recess; a bolt extending through the singletree and cross-bar and through said socket; a coil-spring surrounding the bolt within said socket and a nut for retaining the spring upon the bolt.

In testimony whereof I affix my signature in presence of two witnesses.

THOMAS Y. PAMPLIN.

Witnesses:
WM. L. CLAY,
C. M. SKINNER.